United States Patent Office 3,455,879
Patented July 15, 1969

3,455,879
POLYIMIDES PREPARED FROM AZO
CONTAINING DIAMINES
Frank P. Gay, Hockessin, and Franco Agolini, Wilmington, Del., assignors to E. I. du Pont de Nemours and Company, Wilmington, Del., a corporation of Delaware
No Drawing. Filed Dec. 15, 1966, Ser. No. 601,852
Int. Cl. C08g 20/32
U.S. Cl. 260—47                                         6 Claims

ABSTRACT OF THE DISCLOSURE

Polyimide and polyamide-acid polymers containing azo groups contributed at least by the diamine reactant. The polyimides contract upon heating.

BACKGROUND OF THE INVENTION

Polyimide polymers are articles of commerce finding a variety of uses, especially where good electrical properties, high temperature properties and chemical inertness are of importance. An exemplary patent concerning outstanding aromatic polyimide polymers is the U.S. patent to Edwards, No. 3,179,634, issued Apr. 20, 1965.

The discovery of new polyimide polymers combining one or more of the properties of commercial polyimides plus other properties would be desirable to the art.

SUMMARY OF THE INVENTION

The present invention provides new polymers having a recurring unit of the group

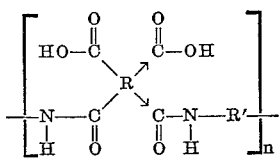

and

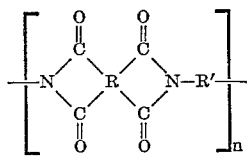

wherein R is an organic tetravalent radical containing at least two carbon atoms, the tetravalent radical being bonded to four carbonyl groups, no more than two carbonyl groups being bonded to any one carbon atom of the tetravalent radical; R' is an organic divalent radical containing an azo group and at least two carbon atoms, with one carbon atom attached to each of the azo nitrogen atoms; $n$ is an integer sufficient to provide a polymer composition having an inherent viscosity of at least 0.1, preferably at least 0.3 as measured at 30° C. on an 0.5% by weight solution in N,N-dimethylacetamide for the polyamide-acid and in concentrated sulfuric acid for the polyimide; and wherein the arrows indicate isomerism.

The polyimide polymers of the present invention are characterized by the outstanding properties of aromatic polyimides generally and accordingly are useful as shaped structures such as self-supporting films, fibers, filaments and the like. For example they have good electrical properties at high temperature, and so are useful as high temperature fabric, electrical insulation, and so forth.

In addition, these novel polyimides reversibly contract upon exposure to heat or light. This is in contrast to known polyimides and provides additional useful applications. For example, as a result of the unusual thermotropic and phototropic response of these compositions, they possess muscle-like behavior. Consequently, they can be used in heat- and light-sensitive cut-off or signaling devices which operate in a fashion just opposite to devices which contain a sensitive element which expands on exposure to heat or light.

These unusual properties also permit the preparation of shaped polyimide articles having a zero coefficient of thermal expansion. By including the proper amounts of azo-containing and non-azo-containing reactants, the amounts for any given combination of specific monomers being easily determined empirically, it is possible to prepare copolymeric polyimides having essentially a zero coefficient of thermal expansion over substantial temperature ranges.

The polyimides are prepared by reacting at least one tetracarboxylic acid dianhydride having the formula

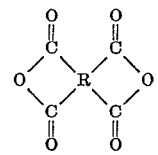

where R is as defined above, with an organic diamine. Preferably R is a tetravalent aromatic radical containing at least one carbocyclic or heterocyclic ring, the carbocyclic ring characterized by benzenoid unsaturation, the four carbonyl groups being attached directly to separate carbon atoms in a ring and each pair of carbonyl groups being attached to adjacent carbon atoms in a ring of the R radical. Adjacent means ortho or peri. Consequently the dicarboxylanhydro rings are 5- or 6-membered, respectively; the preferred aromatic dianhydrides are those in which the carbon atoms of each pair of carbonyl groups are directly attached to ortho carbon atoms in the R group to provide the 5-membered ring as follows:

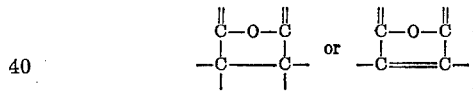

With the preferred dianhydrides, R is a tetravalent organic radical of the group

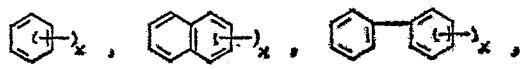

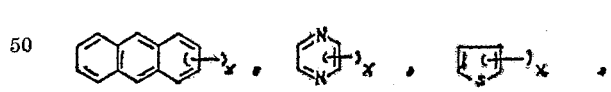

, and

wherein $R^2$ is selected from the group consisting of $R^3$ and $R^4$, wherein $R^3$ is selected from the group consisting of an alkylene chain having 1–3 carbon atoms,

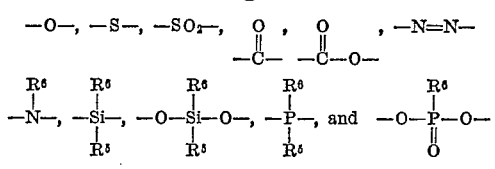

and wherein R⁴ is selected from the group consisting of

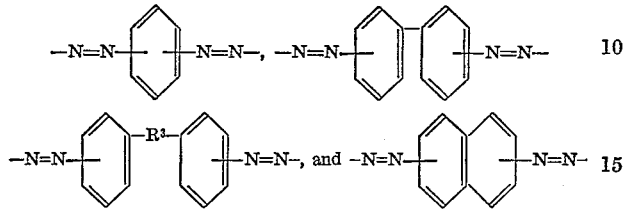

wherein R⁵ and R⁶ are alkyl or aryl, and substituted groups thereof; wherein $x$ is 4; and wherein the $x$ valencies can be attached to the same or different rings in the aromatic systems.

Illustrative dianhydrides suitable for use in making the polyimides include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2'3,3'-diphenyl tetracarboxylic dianhydride; 2,2-bis(3,4-dicarboxyphenyl) propane dianhydride; bis(3,4-dicarboxyphenyl) sulfone dianhydride; 3,4,9,10-perylene tetracarboxylic dianhydride; bis(3,4-dicarboxyphenyl) ether dianhydride; ethylene tetracarboxylic dianhydride; naphthalene1,2,4,5-tetracarboxylic dianhydride; naphthalene-1,4,5,8-tetracarboxylic dianhydride; decahydronaphthalene-1,4,5,8-tetracarboxylic dianhydride; 2,6-dichloronaphthalene-1,4,5,8-tetracarboxylic dianhydride; 2,7-dichloronaphthalene-1,4,5-8-tetracarboxylic dianhydride; 2,3,6,7-tetrachloronaphthalene-1,4,5,8-tetracarboxylic dianhydride; phenanthrene-1,8,9,10-tetracarboxylic dianhydride; cyclopentane-1,2,3,4-tetracarboxylic dianhydride; pyrrolidine-2,3,4,5-tetracarboxylic dianhydride; pyrazine-2,3,5,6-tetracarboxylic dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(2,3-dicarboxyphenyl) sulfone dianhydride; benzene-1,2,3,4-tetracarboxylic dianhydride; 1,2,3,4-butane tetracarboxylic dianhydride; thiophene-2,3,4,5-tetracarboxylic dianhydride; 2,4,3'4'-benzophenone tetracarboxylic dianhydride; 1,1,2,2-ethanetetracarboxylic dianhydride; 2,3,2'3'-benzophenone tetracarboxylic dianhydride; 2,3,3',4-benzophenone tetracarboxylic dianhydride; bis(3,4-dicarboxyphenyl) sulfide dianhydride; cyclohexane-1,2,4,5-tetracarboxylic dianhydride; dimethylcyclobutane-1,2,3,4-tetracarboxylic dianhydride; tricyclo [4,2,2,0²·⁵]-dec-7-ene-3,4,9,10-tetracarboxylic dianhydride; azobenzene-3,4,3'4'-tetracarboxylic acid dianhydride, azobenzene-2,3,2',3'-tetracarboxylic acid dianhydride, azobenzene-2,3,3',4'-tetracarboxylic acid dianhydride, 6,6'-azonaphthalene-2,3,2',3'-tetracarboxylic acid dianhydride, 4,4'-azonaphthalene-1,8,1',8'-tetracarboxylic acid dianhydride, and other position isomers thereof; as well as mixtures of the foregoing.

The organic diamines that can be used are characterized by the formula: $H_2N-R^1-NH_2$, wherein $R^1$ is a divalent aromatic radical preferably selected by the group

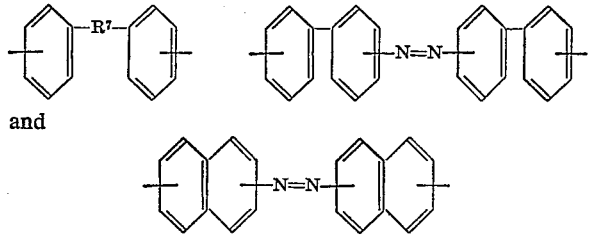

where R⁷ is selected from the group —N—N—,

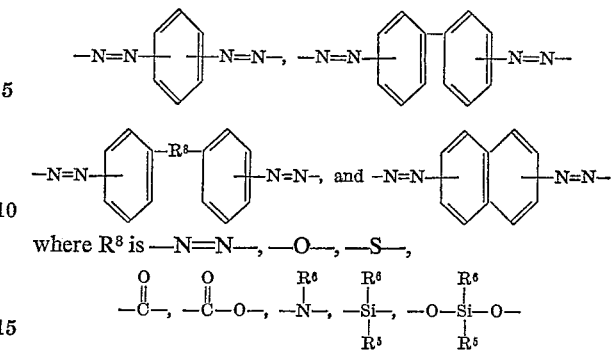

where R⁸ is —N=N—, —O—, —S—,

and an alkylene chain having 1 to 3 carbon atoms, and wherein R⁵ and R⁶ are as hereinbefore defined. Typical azo-containing diamines that can be employed include 4,4'-diaminoazobenzene, 3,3'-diaminoazobenzene, 3,4'-diaminoazobenzene, 2,4'-diaminoazobenzene, p-bis(4-aminophenylazo) benzene, m-bis(4-aminophenylazo) benzene, p-bis(3-aminophenylazo) benzene, 4,4'-bis(p-aminophenylazo) azobenzene, 4,4'-bis(p-aminophenylazo) diphenyl, 4,4'-bis(p-aminophenylazo) diphenyl ether, and 4,4'-bis(p-aminophenylazo) diphenyl sulfone.

As noted above, the novel polymers require the presence of an azo group contributed by the diamine. Other diamines can be coreacted therewith as indicated above. Typical of such diamines are: meta-phenylene diamine; para-phenylene diamine; 4,4'-diamino-diphenyl propane; 4,4'-diamino-diphenyl methane; benzidine; 4,4'-diamino-diphenyl sulfide, 4,4'-diamino-diphenyl sulfone; 3,3'-diamino-diphenyl sulfone; 4,4'-diamino-diphenyl ether; 2,6-diamino-pyridine; bis-(4-amino-phenyl) diethyl silane; bis-(4-amino-phenyl) diphenyl silane; bis-(4-aminophenyl)-N-methylamine; 1,5-diamino naphthalene; 3,3'-dimethyl-4,4'-diamino-biphenyl; 3,3'-dimethoxy benzidine; 2,4-bis(beta-amino-t-butyl) toluene; bis-(para-beta-amino-t-butyl-phenyl) ether; para-bis(2-methyl-4-amino-pentyl) benzene; para-bis(1,1-dimethyl-5-amino-pentyl) benzene; m-xylylene diamine; p-xylylene diamine; bis-(para-amino-cyclohexyl) methane; hexa-methylene diamine; heptamethylene diamine; octamethylene diamine; nonamethylene diamine; decamethylene diamine; 3-methylheptamethylene diamine; 4,4-dimethylheptamethylene diamine; 2,11-diamino-dodecane; 1,2-bis-(3-aminopropoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane; 2,5-diamino-1,3,4-oxadiazole; $H_2N(CH_2)_3S(CH_2)_3NH_2$;

$$H_2N(CH_2)_3N(CH_3)(CH_2)_3NH_2$$

3,3'-dichlorobenzidene; bis-(4-amino-phenyl) ethyl phosphine oxide; bis-(4-amino-phenyl) phenyl phosphine oxide; bis-(4-amino-phenyl)-N-phenylamine; 4,4'-diaminobenzophenone; 3,3'-diaminobenzophenone; 3,4'-diaminobenzophenone; 4-aminophenyl 3-aminobenzoate; and mixtures thereof.

The polyamide-acid and polyimide polymers of the present invention can be prepared according to techniques now known to the art in preparing known polymers of this general type. The polyimide-acid is prepared by reacting one or more suitable diamines with one or more dianhydrides, preferably in an organic solvent for at least one of the reactants, the solvent being inert to the reactants. Reaction preferably is under substantially anhydrous conditions and is carried out for a time and at a temperature below 175° C. sufficient to provide in most instances at least 50% of the corresponding polyamide-acid. As is known, the maximum reaction temperature to be employed in making polyamide-acid is influenced by the diamine used, the dianhydride used, the particular solvent, the percentage of polyamide acid desired and the minimum period of time that one desires for reaction. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. As noted above, polyamide-acids and polyimides of this invention have a molecular weight such that the inherent viscosity of the polymer is at least 0.1, preferably in the range of 0.2 to 5.0. The inherent viscosity is measured at 30° C. at a concentration of 0.5% by weight of the polymer in a suitable solvent. To calculate inherent viscosity, the viscosity of the polymer solution is measured relative to that of the solvent alone.

Inherent viscosity =

$$\frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

Solvents, catalysts, conversion agents for converting the acids to imides and the like to be used are the same as for known polyimides. Reference can be made to such art for those details; for example reference can be made to Edwards, U.S. Patent No. 3,179,634 which is hereby incorporated in its entirety into this specification.

The invention will be exemplified by the following detailed examples.

Example I

To a solution of 2.245 grams (0.0106 mole) of 4,4'-diamino-azobenzene in 50 milliliters of anhydrous N,N-dimethylacetamide (DMAC) was added, portionwise, 2.30 grams (0.0106 mole) of pyromellitic dianhydride at ambient temperature. The solution was stirred for 2 hours. The resulting polyamide-acid had an inherent viscosity of 3.5, measured as a 0.5% by weight solution in DMAC at 30° C. The polyamide-acid solution was cast onto a glass plate with a 25 mil doctor knife, and chemically converted to the corresponding polyimide by immersion for 1 hour in a 10:1:1 (volume ratio) benzene/acetic acid/pyridine bath. The film was stripped from the glass plate and dried in air at 180° C. for 30 minutes and then at 300° C. for 30 minutes. The resulting film was red and had a modulus of about 1,500,000 p.s.i. The film showed excellent resistance to creep as measured by only 5% relaxation of stress after cycling under load between room temperature and 400° C. Upon heating by exposure to an infrared lamp the film contracted to the extent of about 0.6%. Upon cooling again to room temperature the sample returned (expanded) to its original dimension.

Example II

To a solution of 1.00 grams (0.00471 mole) of 4,4'-diaminoazobenzene in 45 milliliters of anhydrous DMAC was added, portionwise, 1.52 grams (0.00471 mole) of 3,4,3',4' - azobenzenetetracarboxylic acid dianhydride. The mixture was stirred for 12 hours, and was then cast into a film with a 20 mil doctor knife. The film was chemically converted and dried as in Example I. The red polyimide which resulted had an inherent viscosity of 0.20, measured as a 0.5% by weight solution in concentrated sulfuric acid at 30° C. The polyimide contracted on heating and expanded on cooling.

Example III

To a solution of 2.00 grams (0.0048 mole) of 4,4'-bis(p-aminophenylazo)azobenzene in 30 milliliters of anhydrous DMAC was added, portionwise, 1.04 grams (0.0048 mole) of pyromellitic dianhydride. The solution was stirred for 15 hours, then cast on a glass plate with a 5 mil doctor knife and converted to polyimide by immersion for 2 hours in 10:1:1 (volume ration) benzene/acetic anhydride/pyridine bath. The transparent red film which resulted was stripped from the glass plate, and dried in air at 160° C. for 30 minutes and then on a flame torch for 15 minutes. It was noted that film contracted upon heating and expanded upon cooling.

While the invention has been specifically described, it should be apparent that changes can be made from these details without departing from its scope. For example, copolymers based on mixtures of amines and/or dianhydrides can also be prepared. They will generally be less deeply colored, and exhibit less contraction on exposure to heat and light than polymers based solely on azo-containing monomers. Other changes will occur to the artisan.

What is claimed is:

1. A film and fiber forming polymer consisting essentially of the recurring unit

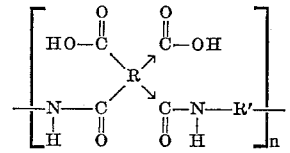

wherein R is an organic tetravalent radical containing at least two carbon atoms, the tetravalent radical being bonded to four carbonyl groups, no more than two carbonyl groups being bonded to any one carbon atom of the tetravalent radical; R' is a divalent aromatic radical selected from the group consisting of

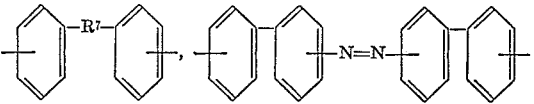

and

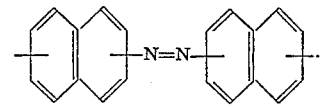

wherein $R^7$ is selected from the group consisting of

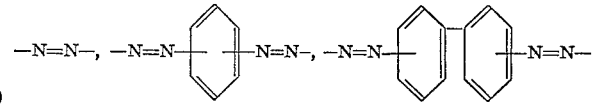

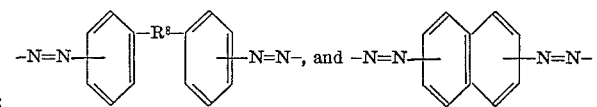

wherein $R^8$ is selected from the group consisting of
—N=N—, —O—, —S—,

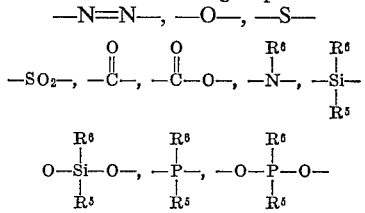

and an alkylene chain having 1 to 3 carbon atoms, and wherein $R^5$ and $R^6$ are alkyl or aryl; $n$ is an integer sufficient to provide a polymer composition having an inherent viscosity of at least 0.1 as measured at 30° C. on an 0.5% by weight solution in N,N-dimethylacetamide, and wherein the arrows indicate isomerism.

2. A polymer according to claim 1 in which R′ is the amine free divalent organic radical in a diamine selected from the group consisting of 4,4′-diaminoazobenzene, 3,3′ - diaminoazobenzene, 3,4′ - diaminoazobenzene, 2,4′-diaminoazobenzene, p - bis(4 - aminophenylazo)benzene, 4,4′-bis(p-aminophenylazo)azobenzene, 4,4′-bis(p-aminophenylazo)diphenyl, 4,4′-bis(p-aminophenylazo)diphenyl ether, and 4,4′-bis(p-aminophenylazo)diphenyl sulfone.

3. A polymer according to claim 2 in which R is the anhydride free tetravalent organic radical in an azo-containing tetracarboxylic dianhydride selected from the group consisting of azobenzene-3,4,3′,4′-tetracarboxylic acid dianhydride, azobenzene-2,3,2′,3′-tetracarboxylic acid dianhydride, azobenzene-2,3,3′,4′-tetracarboxylic acid dianhydride 6,6′ - azonaphthalene - 2,3,2′3′ - tetracarboxylic acid dianhydride, and 4,4′-azonaphthalene-1,8,1′,8′-tetracarboxylic acid dianhydride.

4. A film and fiber forming polymer consisting essentially of the recurring unit

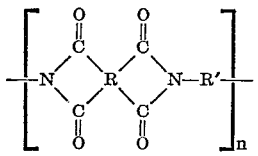

wherein R is an organic tetravalent radical containing at least two carbon atoms, the tetravalent radical being bonded to four carbonyl groups, no more than two carbonyl groups being bonded to any one carbon atom of the tetravalent radical; R′ is a divalent aromatic radical selected from the group consisting of

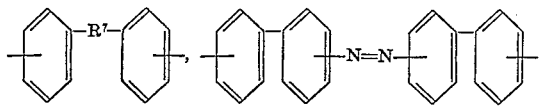

and

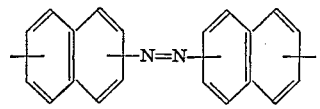

wherein $R^7$ is selected from the group consisting of

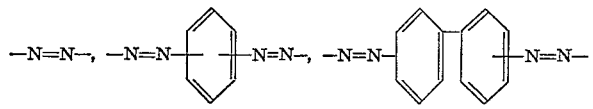

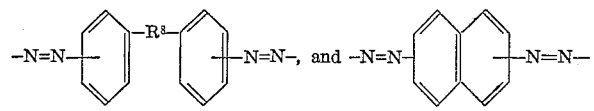

wherein $R^8$ is selected from the group consisting of

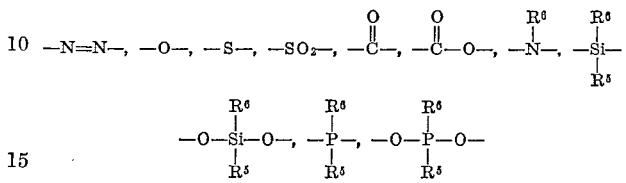

and an alkylene chain having 1 to 3 carbon atoms, and wherein $R^5$ and $R^6$ are alkyl or aryl; $n$ is an integer sufficient to provide a polymer composition having an inherent viscosity of at least 0.1 as measured at 30° C. on an 0.5% by weight solution in concentrated sulfuric acid.

5. A polymer according to claim 4 in which R′ is the amine free divalent organic radical in a diamine selected from the group consisting of 4,4′-diaminoazobenzene, 3,3′ - diaminoazobenzene, 3,4′ - diaminoazobenzene, 2,4′-diaminoazobenzene, p - bis(4 - aminophenylazo)benzene, 4,4′-bis(p-aminophenylazo)azobenzene, 4,4′-bis(p-aminophenylazo)diphenyl, 4,4′-bis(p-aminophenylazo)diphenyl ether, and 4,4′-bis(p-aminophenylazo)diphenyl sulfone.

6. A polymer according to claim 5 in which R is the anhydride free tetravalent organic radical in an azo-containing tetracarboxylic dianhydride selected from the group consisting of azobenzene-3,4,3′,4′-tetracarboxylic acid dianhydride, azobenzene - 2,3,2′,3′ - tetracarboxylic acid dianhydride, azobenzene-2,3,3′,4′-tetracarboxylic acid dianhydride, 6,6′-azonaphthalene-2,3,2′,3′-tetracarboxylic acid dianhydride, and 4,4′-azonaphthalene-1,8,1′,8′-tetracarboxylic acid dianhydride.

References Cited
UNITED STATES PATENTS 3,179,614   4/1965   Edwards _____ 260—30.2
3,355,427   11/1967  Loncrini _____ 260—47

WILLIAM H. SHORT, Primary Examiner

L. L. LEE, Assistant Examiner

U.S. Cl. X.R.

260—32.6, 65, 78